United States Patent
Aboulhosn et al.

(10) Patent No.: US 7,756,836 B2
(45) Date of Patent: *Jul. 13, 2010

(54) PEER-TO-PEER FILE SHARING

(75) Inventors: Amir L. Aboulhosn, Langley (CA); Rui Chen, Burnaby (CA); David M. Koo, Vancouver (CA); David J. Vineberg, Issaquah (CA); James F. Wald, Seattle, WA (US); Stephen Murphy, Vancouver (CA)

(73) Assignee: Microsoft Corporation, Redmond, WA (US)

( * ) Notice: Subject to any disclaimer, the term of this patent is extended or adjusted under 35 U.S.C. 154(b) by 27 days.

This patent is subject to a terminal disclaimer.

(21) Appl. No.: 11/013,212

(22) Filed: Dec. 15, 2004

(65) Prior Publication Data

US 2005/0256909 A1 Nov. 17, 2005

Related U.S. Application Data

(63) Continuation of application No. 10/268,043, filed on Oct. 8, 2002, now Pat. No. 6,938,042, which is a continuation-in-part of application No. 10/115,448, filed on Apr. 3, 2002.

(51) Int. Cl.
*G06F 7/00* (2006.01)
*G06F 17/30* (2006.01)
(52) U.S. Cl. ...................... 707/667; 707/783
(58) Field of Classification Search .............. 707/3, 707/10, 20.4–205
See application file for complete search history.

(56) References Cited

U.S. PATENT DOCUMENTS

| | | | | |
|---|---|---|---|---|
| 5,495,607 A | * | 2/1996 | Pisello et al. | 707/10 |
| 6,211,871 B1 | * | 4/2001 | Himmel et al. | 715/744 |
| 6,418,441 B1 | * | 7/2002 | Call | 707/10 |
| 6,449,615 B1 | * | 9/2002 | Liu et al. | 707/10 |
| 6,516,327 B1 | * | 2/2003 | Zondervan et al. | 707/200 |
| 6,535,912 B1 | * | 3/2003 | Anupam et al. | 709/217 |
| 6,557,028 B2 | * | 4/2003 | Cragun | 709/205 |
| 6,571,245 B2 | * | 5/2003 | Huang et al. | 707/10 |
| 6,687,716 B1 | * | 2/2004 | Bradley | 707/201 |
| 6,804,704 B1 | * | 10/2004 | Bates et al. | 709/217 |
| 6,957,224 B1 | * | 10/2005 | Megiddo et al. | 707/102 |
| 7,031,968 B2 | * | 4/2006 | Kremer et al. | 707/100 |
| 2003/0041094 A1 | * | 2/2003 | Lara et al. | 709/201 |

* cited by examiner

*Primary Examiner*—Cam Y T Truong
(74) *Attorney, Agent, or Firm*—Workman Nydegger

(57) ABSTRACT

A method and system for sharing files between a group of computer systems. The file sharing system allows a group of computer systems to be defined. The files shared by a group are associated with a group folder. A group folder is represented by a folder created by the file system of each member of the group. The folder at each member contains a file for each file that is shared by the group. The files in the folder of a member may be actual files stored at that member, which contains the content of the shared file, or virtual files identifying the actual file that is stored at another member. When a member accesses a virtual file, the file sharing system detects the access and requests that the file owner provide a copy of the file to the accessing member on a peer-to-peer basis. Whenever a shared file is modified, the file owner sends updated metadata for that file to the other members of the group.

14 Claims, 15 Drawing Sheets

M1's File List 100

M1's File List                                          200

Shared
    A        (M2) — 210

Program 1.exe
        Program2.exe.vf    (M2)
           ⋮
                                          } 211
        Text1.txt.vf       (M2)
        Text2.txt
           ⋮
    B        (M2 and M3) — 220

D1.pdf
        D2.pdf.vf          (M2)           } 221
        D3.rtf.vf          (M3)

*Fig. 2*

M3's File List                                    400

Shared
    B     (M1 and M3) ⌒ 410

D1.pdf.sdf      (M1) ⎫
         D2.pdf.sdf      (M2) ⎬ 411
         D3.pdf               ⎭

*Fig. 4*

GO M1 update
member
list create and
update
folder

Invite New Member

Update Folder

M1　　　　　　　　　　　　FO access
virtual
file access req
　────────────────▶ 631
　　　　　　　　　　　retrieve file
　　　　　　　　　　　data
　　　　access res
　◀──────────────── 632

Access Virtual File

Log on update
folder

Log on

PEER-TO-PEER FILE SHARING

CROSS-REFERENCE TO RELATED APPLICATIONS

This application is a continuation of U.S. patent application Ser. No. 10/268,043 filed Oct. 8, 2002, now U.S. Pat. No. 6,938,042 which is a continuation-in-part of and claims priority from U.S. patent application Ser. No. 10/115,448, filed Apr. 03, 2002, all of which are hereby incorporated by reference in their entirety.

TECHNICAL FIELD

The described technology relates generally to methods of and systems for peer-to-peer file sharing between computers.

BACKGROUND

There are a variety of known methods and systems of differing complexity for sharing files between two or more computers, both centralized and distributed. Conventional centralized client-server file sharing systems often require a massive server storage infrastructure. More basic file sharing systems that merely allow files to be uploaded to and then to be downloaded from a centralized site (e.g., an FTP site on the Internet) likewise may need to provide a substantial amount of centralized storage space. Distributed systems reduce the need for centralized file storage, but they may suffer from one or more disadvantages such as an unfamiliar user interface, a need for a substantial amount of user training, lack of up-to-date information on files currently available for retrieval, and so forth.

BRIEF DESCRIPTION OF THE DRAWINGS

FIGS. 2-4 are display pages illustrating the file system folder structure for members of various groups.

FIGS. 6A-6E are diagrams illustrating the message flows between members of a group in one embodiment.

DETAILED DESCRIPTION

Figure 1:
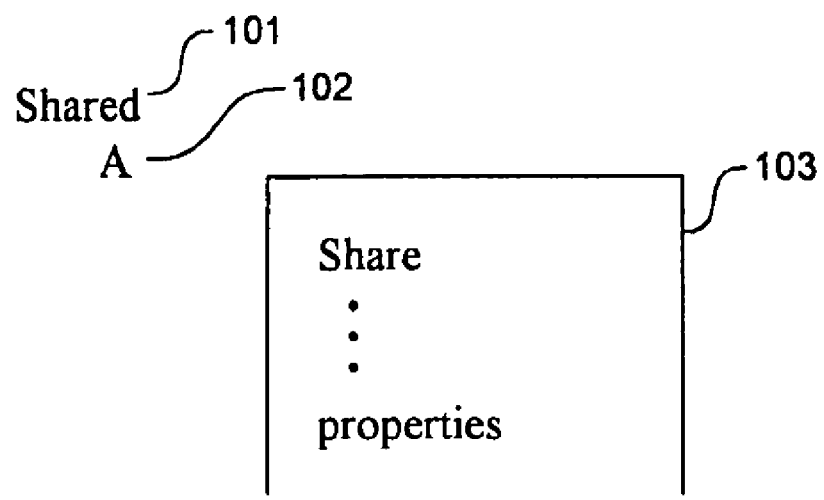
FIG. 1 is a display page illustrating a file system folder structure with a shared folder in one embodiment.

A method and system for sharing files between a group of computer systems is provided. In one embodiment, the file sharing system allows a group of computer systems to be defined. One computer system of the group may be designated as the "group owner." The group owner may have the sole authority to invite other computer systems to join the group. Alternatively, other computer systems of the group ("members of the group") may have the authority to also invite other computer systems to join the group. In one embodiment, the files shared by a group are associated with a group folder. A group folder is represented by a folder created by the file system of each member. The folder at each member contains a file for each file that is shared by the group. The files in the folder of a member may be actual files stored at that member, which contains the content of the shared file, or virtual files identifying the actual file that is stored at another member. A shared file is identified by metadata stored in association with the virtual file (e.g., as properties of the virtual file). A member who shares a file that is stored at that member is referred to as the "file owner." When a file is shared, the folder of the file owner contains the actual file and the folders of the other members of the group contain a virtual file corresponding to the shared file. When a member accesses a virtual file, the file sharing system detects the access and requests that the file owner provide a copy of the file to the accessing member on a peer-to-peer basis. Whenever a shared file is modified, the file owner sends updated metadata for that file to the other members of the group. In this way, the members use their local file systems to represent each shared file of the group and defer downloading a shared file until it is accessed by a member who is not the file owner.

In one embodiment of the file sharing system, the members receive from another member a notification that a file is to be shared with the members of the group. The notification includes metadata describing the file to be shared. For example, the metadata may identify the file name, the file owner, the create date of the file, the last modified date of the file, the size of the file, and so on. Upon receiving the notification, the member creates a virtual file in their folder for the group using the file system of that member. A virtual file may be a file that has the same name as the file being shared except for an identifying extension, may have no actual content (e.g., a file size of 0), and may have the metadata represented as attributes of the virtual file. Whenever the actual file is changed at the file owner, the file owner sends the updated metadata for the file to the other members, who update the metadata associated with their corresponding virtual file as appropriate. The members, who are not the file owner, use the metadata when accessing the shared file.

In one embodiment, the group owner maintains a list of the group members. All messages related to metadata updates are routed through the group owner. For example, when a shared file is updated, the file owner sends a message to the group owner containing new metadata for the shared file. The group owner identifies the other members of the group and sends the updated metadata to each member. A member may be either online or offline. (More generally, a computer system, regardless of whether it is currently a member of a group, can be online or offline.) If a member is online, then the member can receive messages from other members, can access the files whose file owners are also online, and can notify other members of changes that it makes to the shared files that it owns. If a member is offline, the member can neither receive nor send any messages. In one embodiment, the file sharing system may have a server (e.g., an authorization server) that controls whether a member is currently online or offline. A member goes online by providing authentication information to the authentication server. When the information can be authenticated, the member is online. The authentication server, when requested by a member, provides access information for another online member. When a member goes online, it contacts the group owner (assuming that the group owner is currently online) to synchronize its copy of the group folder with the group owner. For example, files of the group folder may have been added, deleted, or updated while the member was offline. Also, the member while offline may have added, deleted, or updated files of the group folder. When a member goes online, its access information (e.g., IP address) is provided to the authentication server so that other members of the group can send messages (e.g., metadata updates) to that member. When a computer system goes online the authentication server notifies the group owners who can forward the notification to the group members as appropriate. In an alternate embodiment, a group owner can delegate to another member its responsibility to route metadata updates, member status updates, and so on. The delegation will allow the group to function even while the group owner is offline.

A group owner may invite other computer systems to join the group as members. In one embodiment, a computer system is eligible to be a member of a group after the computer system has registered with the authentication server. The registration process ensures that the computer system is authorized to be a member and provides authentication information for use in subsequently authenticating the computer system when it comes online. Also, a group owner and file owner may, before interacting with a member, verify with the authentication server that the member is still registered. This verification will help to prevent access to the shared files by a member whose registration has lapsed. The group owner requests the address of the computer system to be invited from the authentication server. If the computer system to be invited is currently online, the authentication server provides the address. The group owner then sends an invitation message. When the computer system receives an invitation request message, it can either accept or decline the invitation via an invitation response message sent to the group owner. If the invitation is accepted, the group owner adds the new member to its list of members for that group. The new member then synchronizes its folder with the group owner. If the computer system that is being invited to join the group is not currently online, then the group owner may queue the message until the computer system goes online. Similarly, the computer system may queue its response to the invitation if the group owner is not currently online.

In one embodiment, a file owner may decide that ownership of a file should be transferred to the group owner. In such case, the group owner is considered the proxy file owner and is provided with a copy of that file. When other members access that shared file, they direct their requests to the proxy file owner. The group owner is also responsible for distributing updates to the metadata of the shared file. The use of a proxy file owner allows other members of the group to have access to a shared file even though the actual file owner of the shared file may be offline at that time. Such proxying of file ownership is particularly useful when the group owner is generally online and the file owner is generally offline (e.g., the file owner is a laptop computer).

In one embodiment, a group owner may delete a group. To delete a group, the group owner sends a message to each group member. When a group member receives the message, it typically deletes its local shared folder for the group. The group owner also deletes its local shared folder for the group and then suspends sending of synchronization messages (e.g., new shared file metadata) for the group. Alternatively, a group member can elect not to delete its local shared folder. In such a case, the folder becomes inactive that is a folder with no synchronization. The virtual files within an inactive folder can still be accessed assuming that the file owner also did not delete its local shared folder.

FIG. 1 is a display page illustrating a file system folder structure with a shared folder in one embodiment. Display page 100 displays a folder 101, named "Shared," that contains a member's folders corresponding to shared folders. In this example, a shared folder "A" contains the shared files of group "A". The display page also contains a menu 103 that is displayed when the shared folder "A" is selected by a user. The file sharing system may receive event notifications from the file system relating to access to the shared folders such as when a user right clicks on a shared folder. The menu lists various menu items that are available. The "share" menu item allows the user to access functions of the file sharing system related to the sharing of the files within the shared folder, such as sending invitations.

Figure 3:
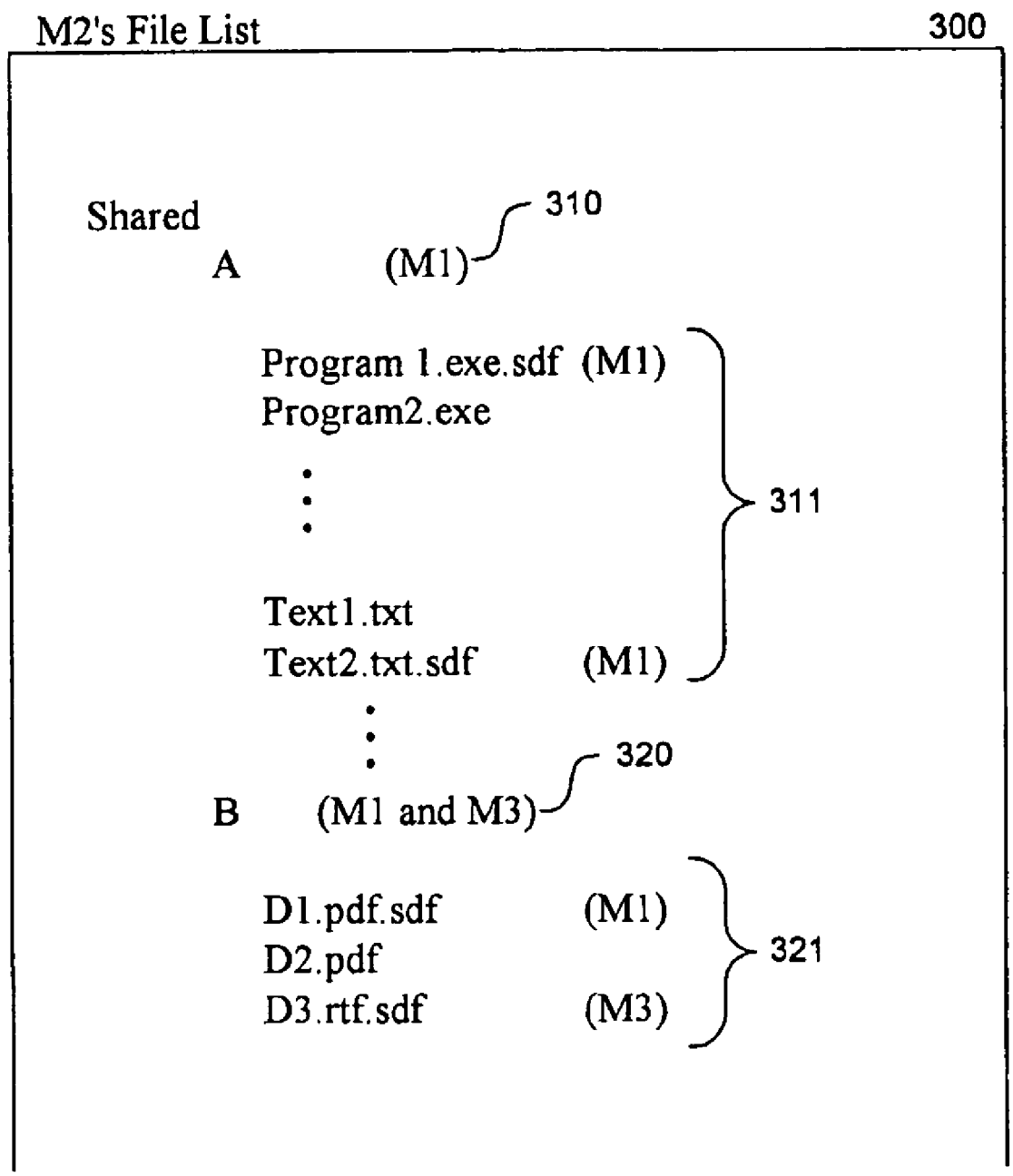

FIGS. 2-4 are display pages illustrating the file system folder structure for members of various groups. In the example illustrated, three computers system are identified as M1, M2, and M3. M1 and M2 are members of a group "A," and M1, M2, and M3 are members of group "B." Display pages illustrating the file system folder structure for the shared folders of M1, M2, and M3 are illustrated in FIGS. 2, 3, and 4, respectively. Although these display pages do not illustrate shared subfolders, one skilled in the art will appreciate that a shared folder may contain shared subfolders.

Display page 200 of FIG. 2 illustrates that M1 has a shared folder named "A" for group "A" 210 and a shared folder named "B" for group "B" 220. The parentheticals next to the folder names identify the other members of the group and would typically not be displayed by a file system. Shared folder "A" contains four shared files 211 named "Program1.exe," "Program2.exe.vf," "Text1.txt.vf," and "Text2.txt." The file name extension of "vf" identifies a shared file as a virtual file. The second-to-the-last file name extension of a virtual file corresponds to the last file name extension of the actual file. For example, the second-to-the-last file name extension of "Program2.exe.vf" is "exe," which identifies that the actual file is an executable file. In one embodiment, the name of a virtual file is the same as the corresponding actual file, except with the "vf" extension appended. Alternatively, the name of a virtual file could be completely different from the name of the corresponding actual file. In such a case, the metadata can include the name of the actual file. The shared files, "Program2.exe.vf" and "Text1.txt.vf," are virtual files and, as indicated by the parentheticals, are stored at M2. The shared files, "Program1.exe" and "Text2.txt," are stored at M1 and are thus not virtual files for M1. The shared folder "B" contains three shared files 221 named "D1.pdf," "D2.pdf.vf," and "D3.pdf.vf."

Display page 300 of FIG. 3 illustrates that M2 has a shared folder "A" for group "A" 310 and a shared folder "B" for group "B" 320. Shared folder "A" contains a file 311 for each of the four shared files for group "A." In this example, since the files "Program1.exe" and "Text2.txt" are stored at M1, they are represented at M2 as virtual files as indicated by the "vf" extensions. Similarly, since the shared files "D1.pdf" and "D3.rtf" 321 of shared folder "B" are stored at M1 and M3, respectively, they are represented as virtual files at M2.

Display page 400 of FIG. 4 illustrates that M3 has a shared folder "B" for group "B" 410. Shared folder "B" contains a file for each of the three shared files for group "B." In this example, since the shared files "D1.pdf" and "D2.pdf" 411 of shared folder "B" are stored at M1 and M2, respectively, they are represented at M3 as virtual files.

Figure 5:
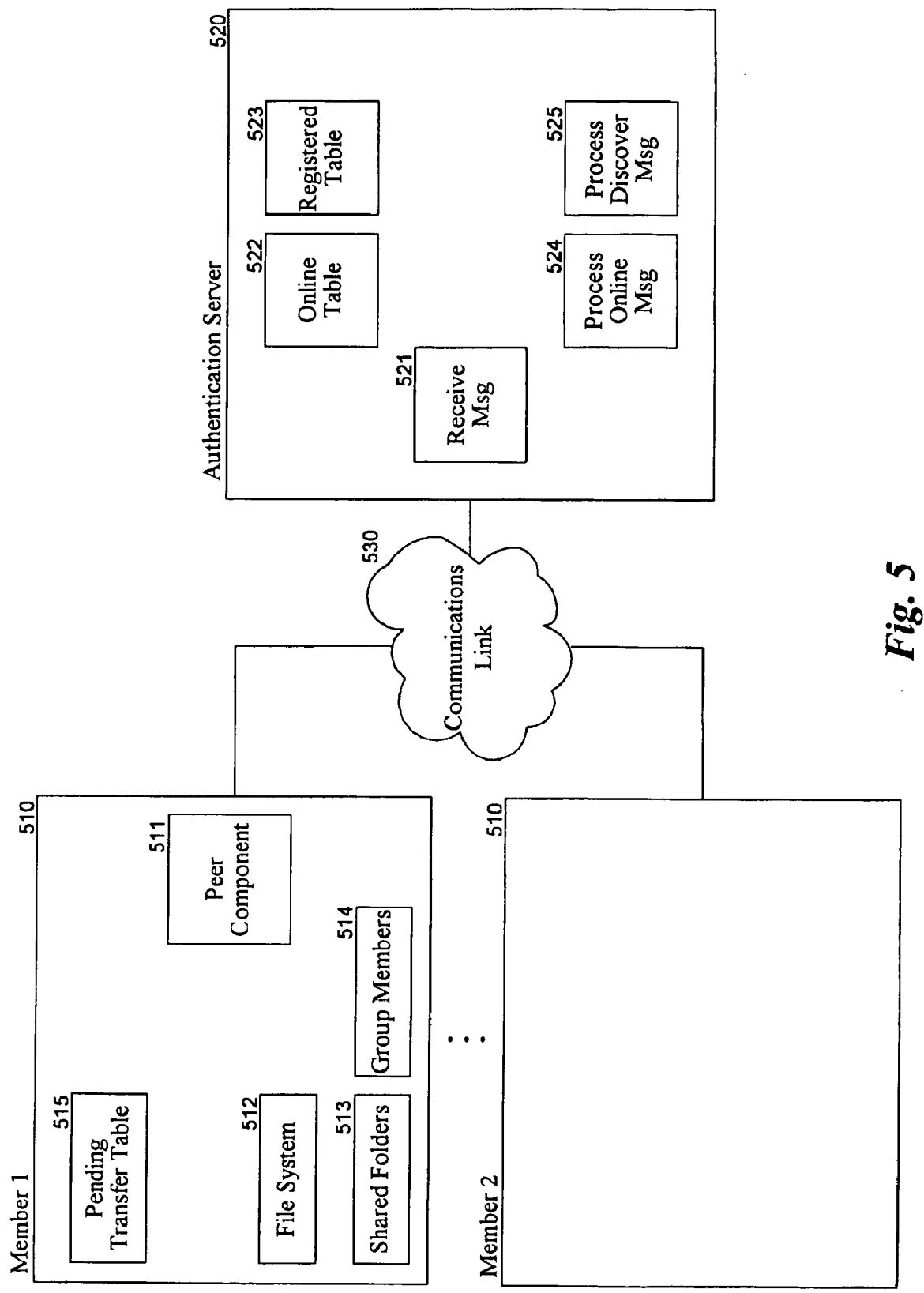
FIG. 5 is a block diagram illustrating components of the file sharing system in one embodiment.

FIG. 5 is a block diagram illustrating components of the file sharing system in one embodiment. The computer systems 510 communicate with each other and with authentication server 520 via communications link 530. Computer systems 510 include a peer component 511, a file system 512, shared folders 513, a group members table 514, a pending transfer table 516, and other components not illustrated in this figure. The peer component, which may be downloaded from the authentication server when the computer system is registered, controls the sharing of files with other computer systems. The functions of the peer component, which are described in detail below, include registering a computer system, placing a computer system online, creating groups, inviting computer systems to become members of a group, sending updates to metadata, and so on. The file system may be a conventional file system provided by an operating system. The shared folders represent the folders within the file system folder structure that have been created by the file sharing system. The shared folders include a folder for each group for which this computer system is a member. The group member table is maintained by the group owners and contains the identification of each member of the group. The pending transfer table contains information related to the state of the transfers that that were interrupted for some reason (e.g., failure of the communications link). The pending transfer information allows a file transfer to be resumed at the point it was interrupted.

The authentication server includes a receive message component 521, an online table 522, a registered table 523, a process online message component 524, a process discover message component 525, and other components not illustrated in this figure. The receive message component receives messages from the computer systems and forwards them to the appropriate components for processing. The registered table contains an entry for each computer system that is currently registered with the file sharing system. Each entry may contain authentication information that is used to authenticate a computer system that attempts to come online. The online table contains an entry for each computer system that is currently online. Each entry contains the address (e.g., internet protocol address) of the online computer system. The process online message component coordinates the requests of computer systems to come online. The process discover message component retrieves the address of an identified computer system (if it is online) from the online table and provides it to the requesting computer system. The functions of the authentication server may be divided among multiple servers. For example, there may be separate servers for handling registration requests, online requests, and discovery requests.

The computer systems and servers may include a central processing unit, memory, input devices (e.g., keyboard and pointing devices), output devices (e.g., display devices), and storage devices (e.g., disk drives). The memory and disk drives are storage devices. A computer-readable media that may contain instructions that implement the file sharing system. In addition, the data structures and message structures may be stored or transmitted via a data transmission medium, such as a signal on a communications link. Various communications links may be used, such as the Internet, a local area network, a wide area network, or a point-to-point dial-up connection. In some cases, one computer system may not be able to communicate direct with or initiate communications with another computer system. For example, one computer system may be behind a firewall that does not allow communications to be initiated by a computer system on the other side of the firewall. Also, a computer system may connect to the network via a Network Address Translator. In such cases, various well-known mechanisms may be used to allow the computer systems to communicate, such as an intermediate or tunneling server mechanism.

Figure 6A:
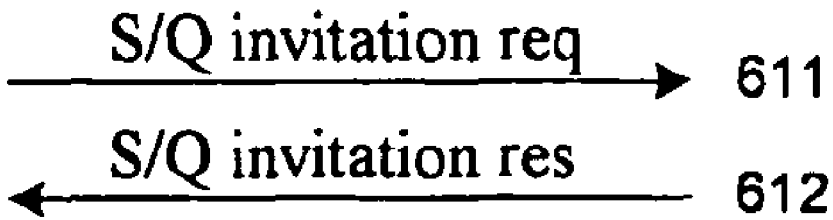
Figure 6A:
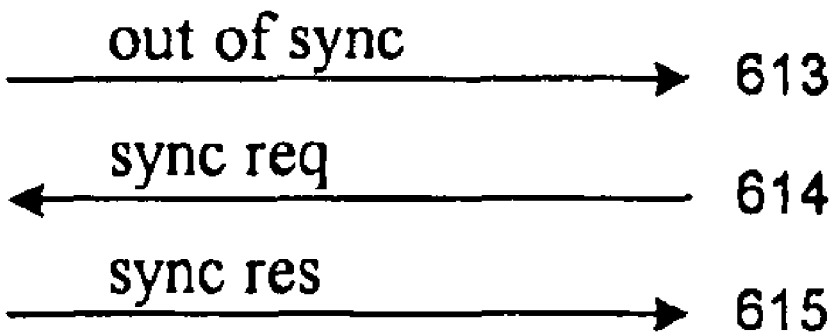

FIGS. 6A-6E are diagrams illustrating the message flows between members of a group in one embodiment. FIG. 6A is a diagram illustrating the message flows when a group owner invites a computer system to become a new member. The group owner initially receives an indication from its user that a registered computer system is to be invited to join the group. The file sharing system may provide to the user a list of the registered computer systems (e.g., stored in the registered table) so that the user can identify the computer system to be invited. The group owner then sends an invitation request message 611 to the invited computer system. The group owner accesses the authentication server to retrieve the address for the invited computer system (i.e., to discover the invited computer system). If the invited computer system is currently online, then the authentication server provides the address and the group owner sends the invitation request message to that address. If, however, the invited computer system is not currently online, then the group owner queues the invitation request message until the group owner is notified by the authentication server that the invited computer system comes online. (In general, a registered computer system sends a message to another registered computer system by first retrieving the address of the recipient computer system from the authentication server. If the computer system is not currently registered or is offline, then the authentication server returns an error message. The sending computer system then sends the message directly to the address. If the authentication server does not return an address for the recipient computer system, then the sending computer system may queue certain types of messages until the recipient computer system comes online. Other types of messages might not be queued because the information of the message can be obtained, for example, during a synchronization process.) When the invited computer system receives the invitation request message, it notifies its user of the invitation request. The user may be notified by the creation of a shared folder for the group, by a flashing icon, or by some other means. When the user eventually decides to accept or reject the invitation request, the invited computer system sends an invitation response message 612 to the group owner. When the group owner receives the invitation response message, it updates its member list for that group accordingly. Assuming that the invited computer system accepted the invitation, the group owner sends an out-of-synchronization message 613 to the new member. The out-of-synchronization message notifies the new member that it needs to synchronize its copy of the shared folder with the group owner's copy. The new member then sends a synchronization request message 614 to the group owner. Upon receiving the synchronization request message, the group owner collects the metadata for the shared files of the group and sends that metadata to the new member via a synchronization response message 615. When the new member receives the synchronization response message, it creates the appropriate virtual files in the shared folder.

Figure 6B:
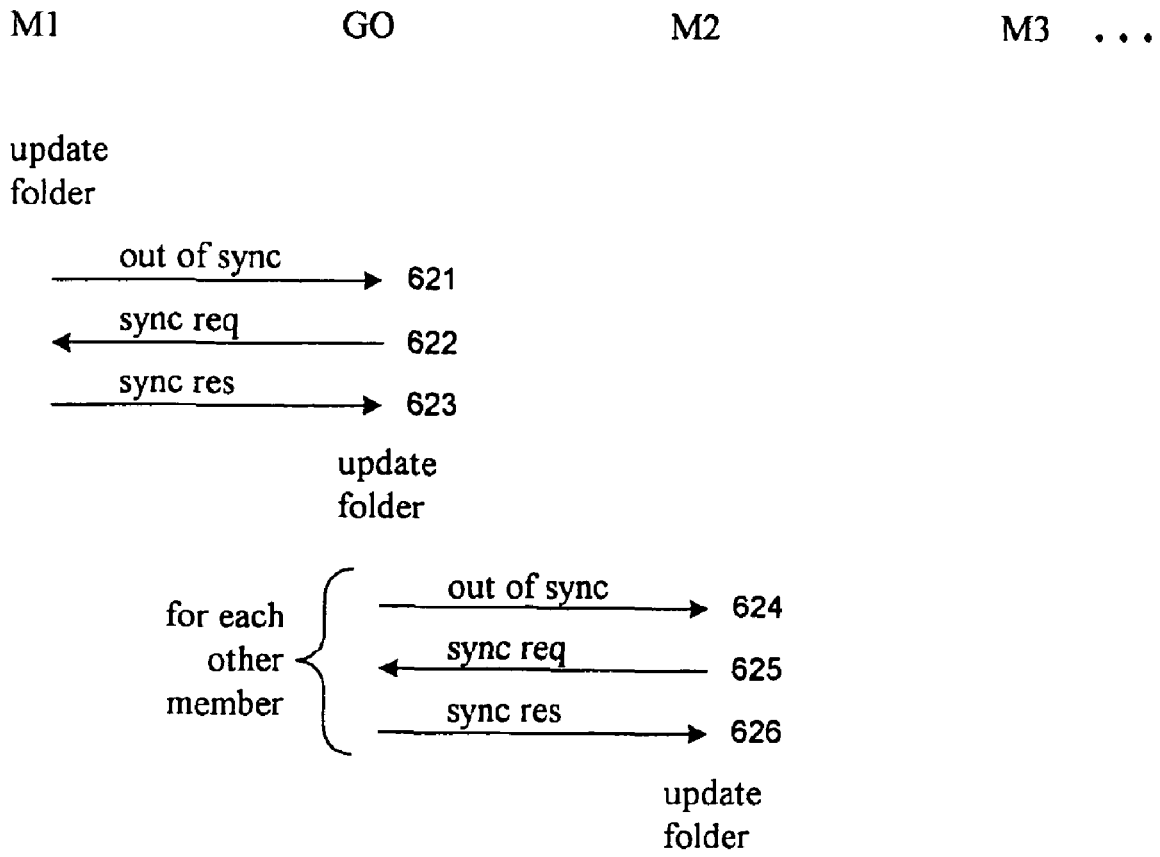

FIG. 6B is a diagram illustrating the message flows when a member of the group updates the group folder. A member updates a folder by adding, deleting, or modifying a file of the shared folder. The member that updates the folder sends an out-of-synchronization message 621 to the group owner, unless it is the group owner itself that updates the folder. In response, the group owner sends a synchronization request message 622 to the updating member. The updating member responds with a synchronization response message 623 that contains the metadata describing the update. The group owner upon receiving the metadata updates to the metadata associated with the shared folder. The group owner then notifies each other group member of the update. The group owner notifies a member by first sending an out-of-synchronization message 624 to the member. The member then responds by sending to the group owner a synchronization request message 625. In response, the group owner sends the metadata to the members via a synchronization response message 626. Upon receiving the metadata, the member updates its folder. In one embodiment, certain messages relating to updating a folder are not queued if a member is offline. When that member comes online, the online synchronization process will result in synchronization of the folders.

FIG. 6C is a diagram illustrating the message flows when a member accesses a virtual file. When a member detects access of a virtual file, the member sends an access request message 631 to the file owner. The metadata stored at the member for the accessed virtual file contains the identification of the file owner. Upon receiving the access request message, the file owner retrieves the data of the file and sends the data to the accessing member via an access response message 632. In one embodiment, the access response message may be a series of messages each containing a portion of the access file. In such a case, the accessing member may persistently maintain an indication of the portion of the access file that has been received so far. In the event that the transfer of the file is interrupted, the accessing member may request the file owner to resume the transfer of the file where it left off.

Figure 6D:
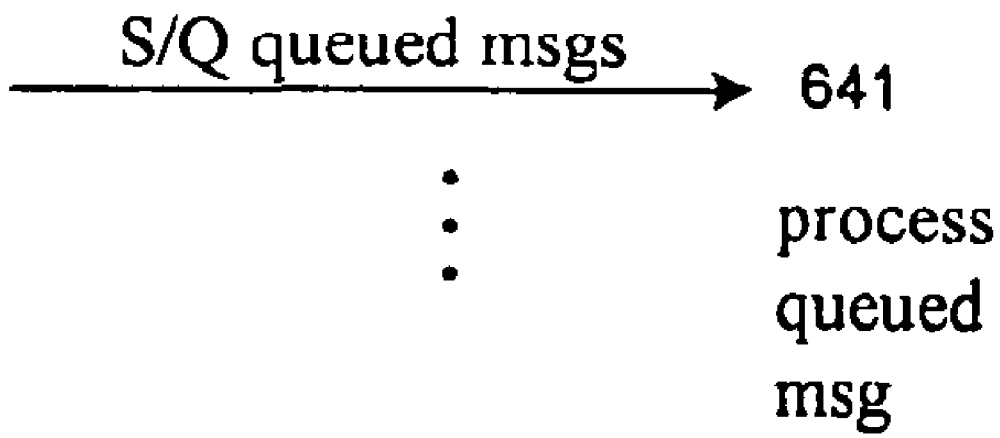
Figure 6D:
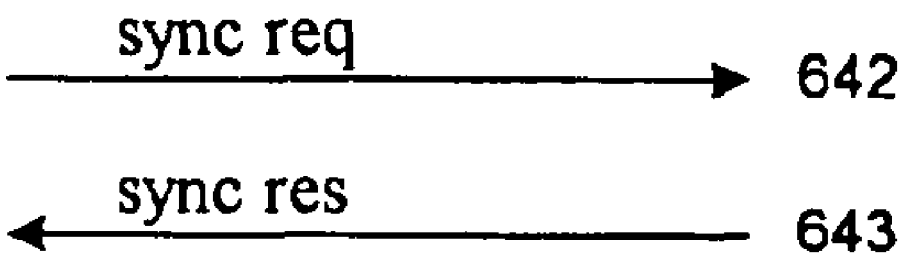

FIG. 6D is a diagram illustrating the message flows when a member comes online. A member comes online by providing authentication information to the authentication server. Once authenticated, the member is online and sends its queued messages into the recipient computer systems that are currently online. The member then sends a synchronization request message 642 to the group owner. The group owner collects the metadata for the shared folder and sends a synchronization response message 643 to the new online member. When the new online member receives the metadata, it updates its folder accordingly. The new online member may also identify whether it made updates to the folder while it was offline. If so, the member notifies the group owner that it is out of synchronization, and the updating of the metadata is performed in a manner similar to that illustrated in FIG. 6B. Alternatively, the updates that have been made while the member was offline may be reflected in queued messages.

Figure 6E:
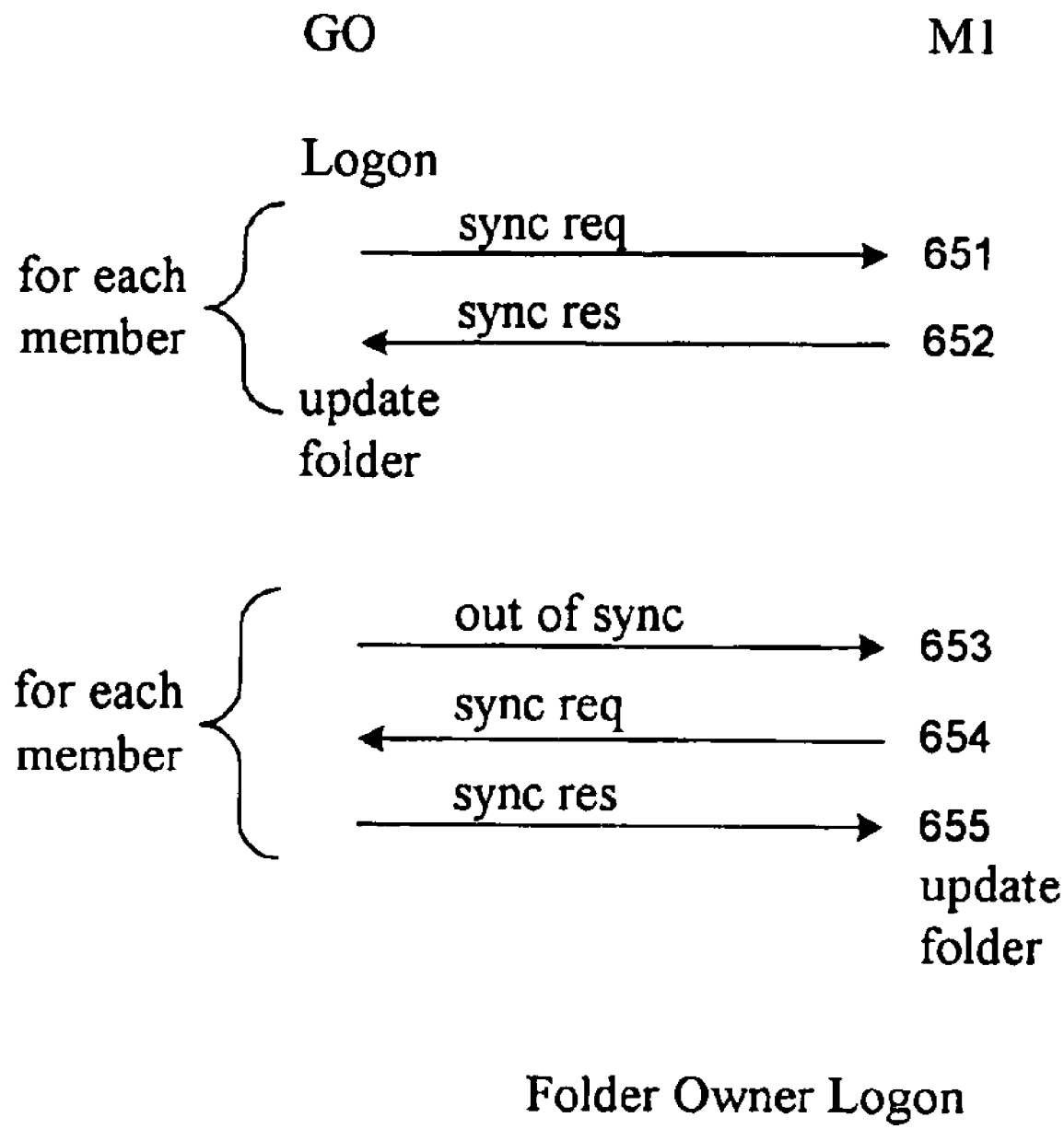

FIG. 6E is a diagram illustrating the message flows when a group owner comes online. When a group owner becomes online, it sends a synchronization request message 651 to each member. Each member responds with a synchronization response message 652 containing the metadata for that shared folder. The group owner then updates its shared folder to correspond to all the updates by any of the members that occurred while the group owner was offline. The group owner then sends an out-of-synchronization message 653 to each member. In response, each member sends a synchronization request message 654 to the group owner. The group owner then sends the current metadata for the shared folder in a synchronization response message 655 to each member. The members then update their folders accordingly.

Figure 7:
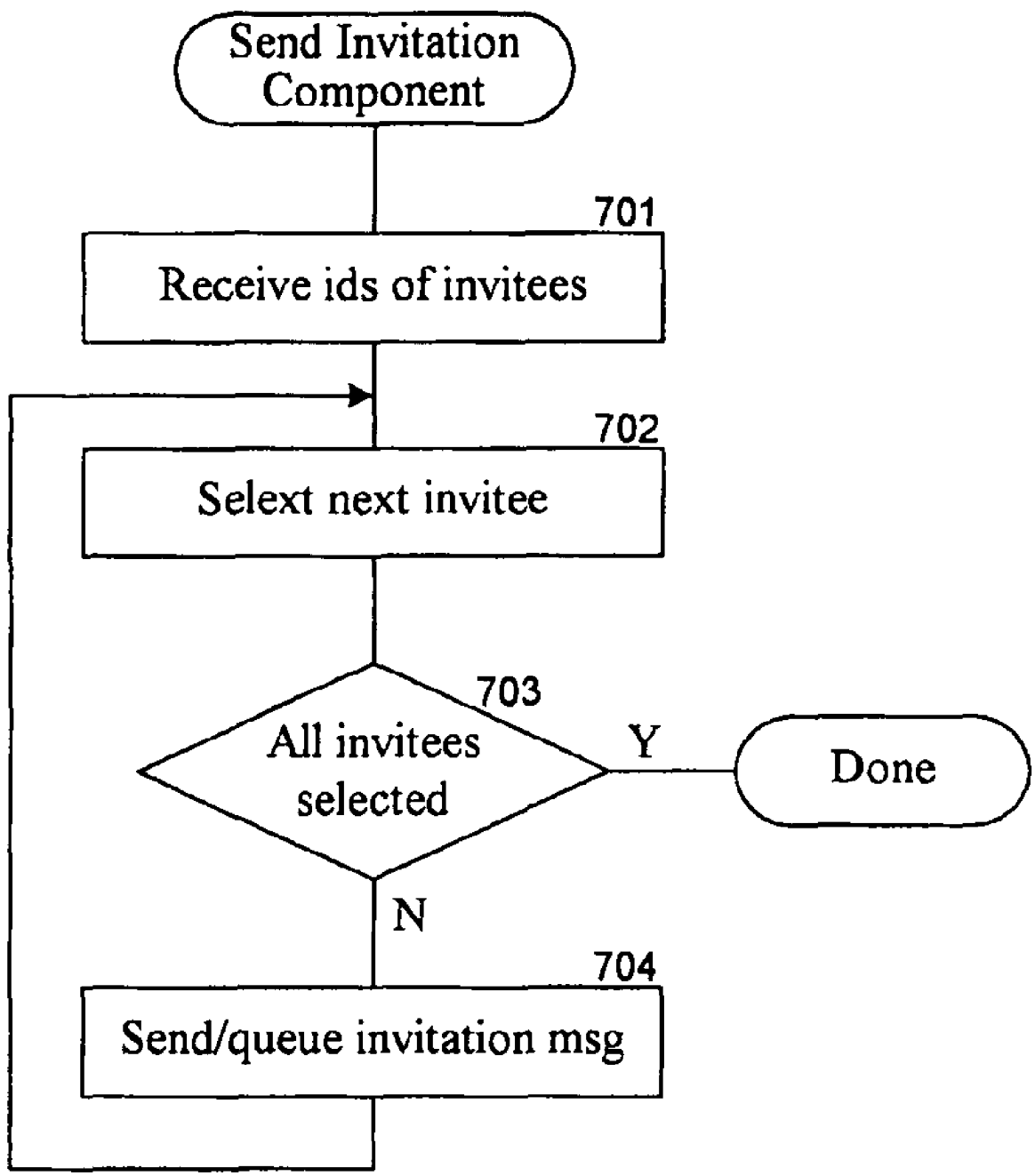
FIG. 7 is a flow diagram illustrating the processing of an invite component or peer component in one embodiment.

FIG. 7 is a flow diagram illustrating the processing of an invite component of a peer component in one embodiment. The invite component controls the sending of an invitation request message to each computer system that is invited to be a member of a group. In block 701, the component receives the identification of each computer system that is to be invited to join the group. In block 702-704, the component loops selecting each invited computer system and sending it an invitation request message. In block 702, the component selects the next invited computer system. In decision block 703, if all the invited computer systems have already been selected, then the component completes, else the component continues at block 704. In block 704, the component sends an invitation request message to the selected computer system. The component then loops to block 702 to select the next invited computer system. As described above, a message is sent to a computer system by providing the identification of that computer system to the authentication server. The authentication server then returns the address of that identified computer system if it is currently online. If not online, then the sending computer system queues the invitation request message.

Figure 8:
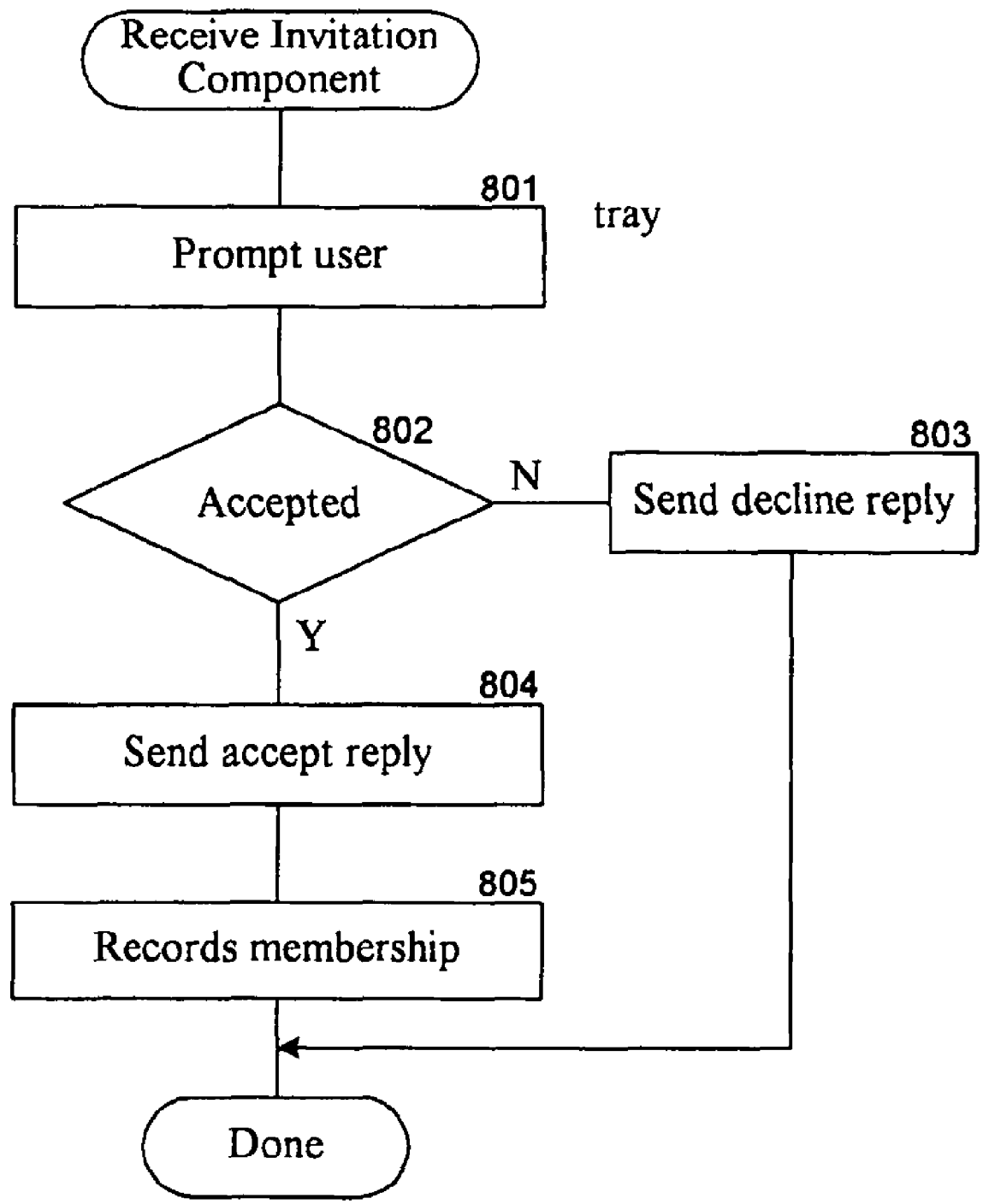
FIG. 8 is a flow diagram illustrating the processing of the peer component when it receives an invitation request message in one embodiment.

FIG. 8 is a flow diagram illustrating the processing of the peer component when it receives an invitation request message in one embodiment. In block 801, the component notifies its user that an invitation request message has been received. The component may notify the user in various ways such as creating the shared folder with an indication that the computer system has been invited to join the group associated with that folder, by highlighting an icon for the file sharing system that may be displayed on a program tray, and so on. In decision block 802, if the user accepts the invitation, then the component continues at block 804, else the component continues at block 803. In block 803, the component sends an invitation response message to the group owner indicating that it has declined the invitation and then completes. In block 804, the component sends an invitation response message to the group owner indicating that it has accepted the invitation. In block 805, the component notes that the computer system is now a member of that group and then completes.

Figure 9:
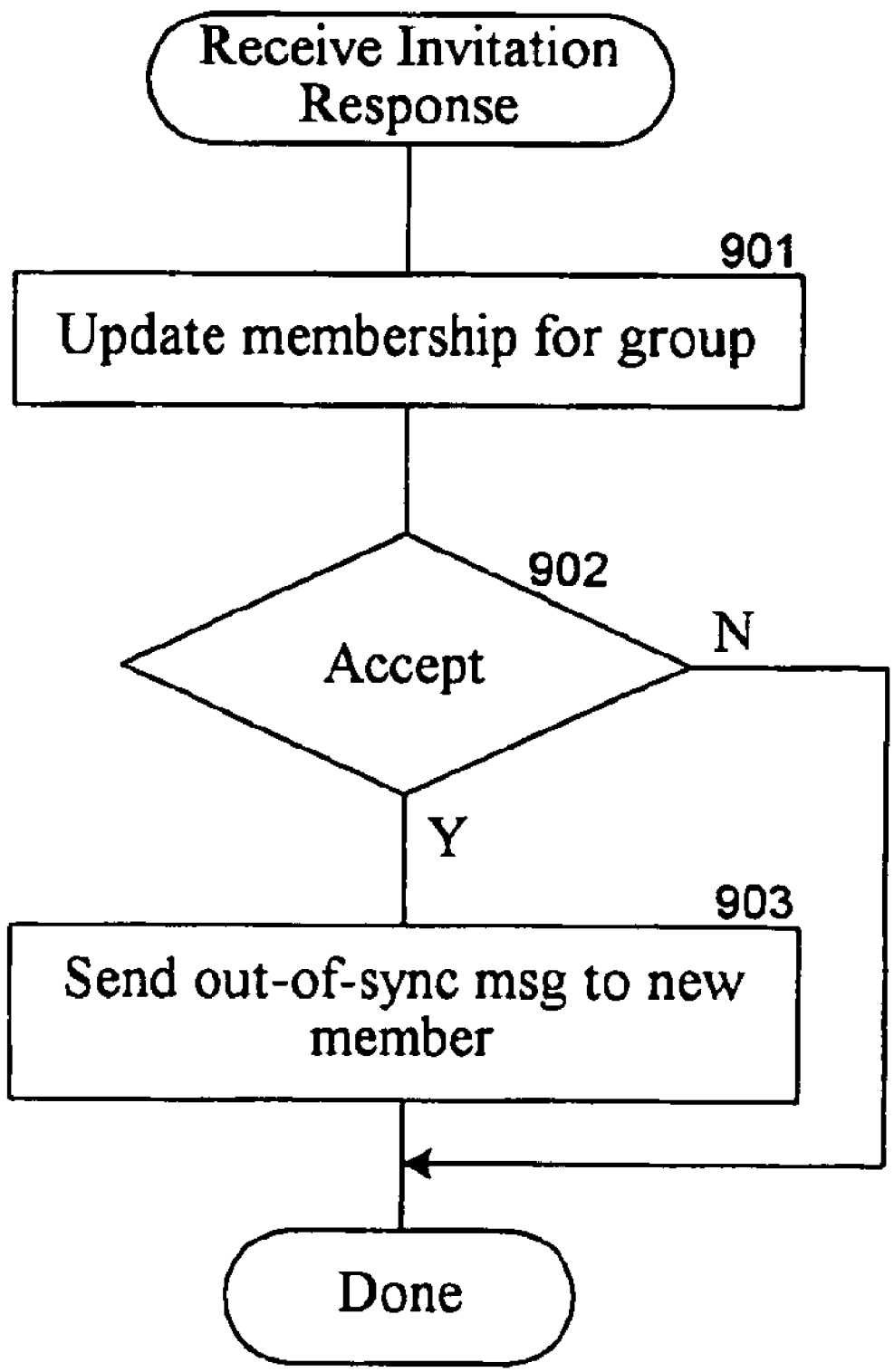
FIG. 9 is a flow diagram illustrating the processing of the peer component when it receives an invitation response message in one embodiment.

FIG. 9 is a flow diagram illustrating the processing of the peer component when it receives an invitation response message in one embodiment. In block 901, the component updates the membership list for the group as appropriate. In decision block 902, if the computer system accepted the invitation, then the component continues at block 903, else the component completes. In block 903, the component sends an out-of-synchronization message to the new member and then completes.

Figure 10:
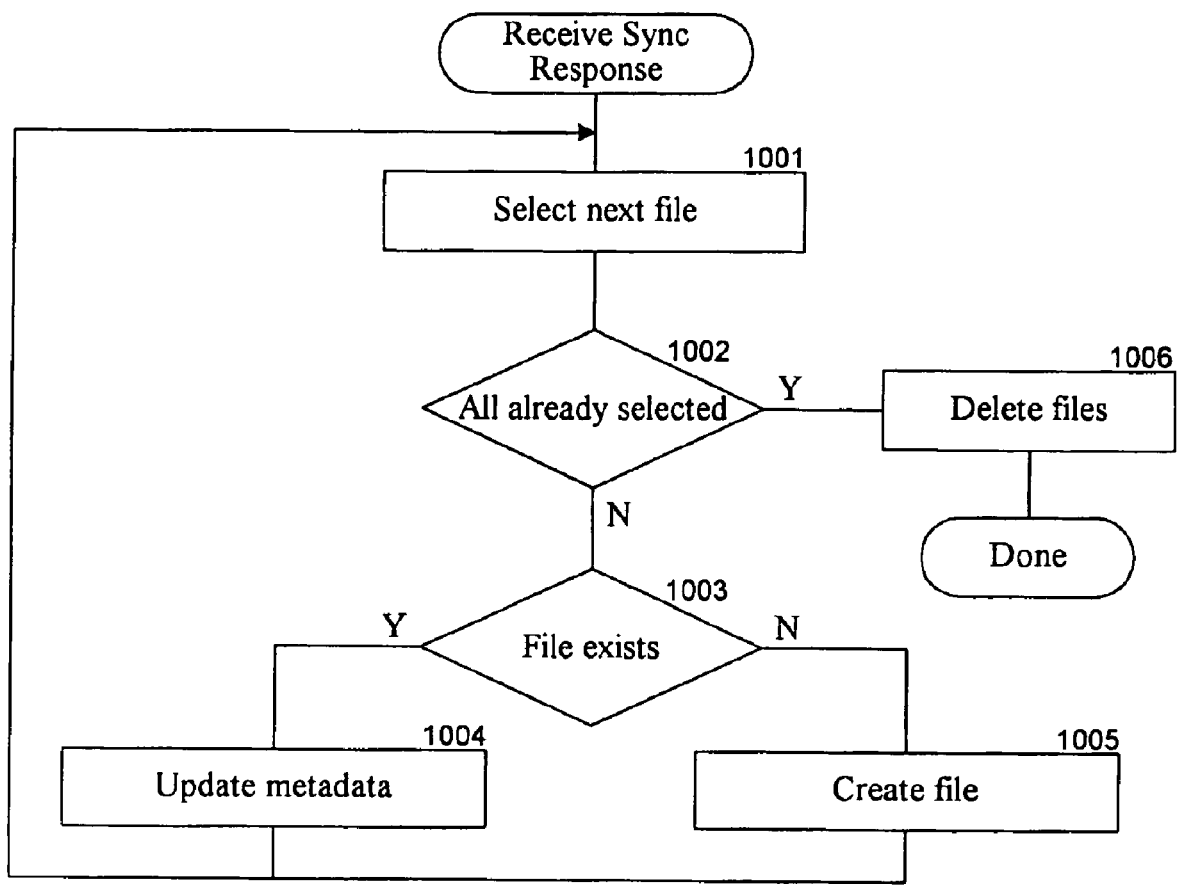
FIG. 10 is a flow diagram illustrating the processing of the peer component when it receives a synchronization response message in one embodiment.

FIG. 10 is a flow diagram illustrating the processing of the peer component when it receives a synchronization response message in one embodiment. The synchronization response message contains metadata for each file currently in the group. The component updates the metadata for each file in the group, creating new files as necessary. In addition, the component deletes any virtual files that it has locally that are not represented by metadata. In block 1001, the component selects the next file. In decision block 1002, if all the files have already been selected, then the component continues at block 1006, else the component continues at block 1003. In decision block 1003, if the selected file already exists in the shared folder, then the component continues at block 1004, else the component continues at block 1005. In block 1004, the component updates the metadata for the existing file and then loops to block 1001 to select the next file. In block 1005, the component creates a new virtual file based on the metadata for that file and then loops to block 1001 to select the next file. In block 1006, the component deletes any virtual files of the shared folder that is not represented by the metadata and then completes.

Figure 11:
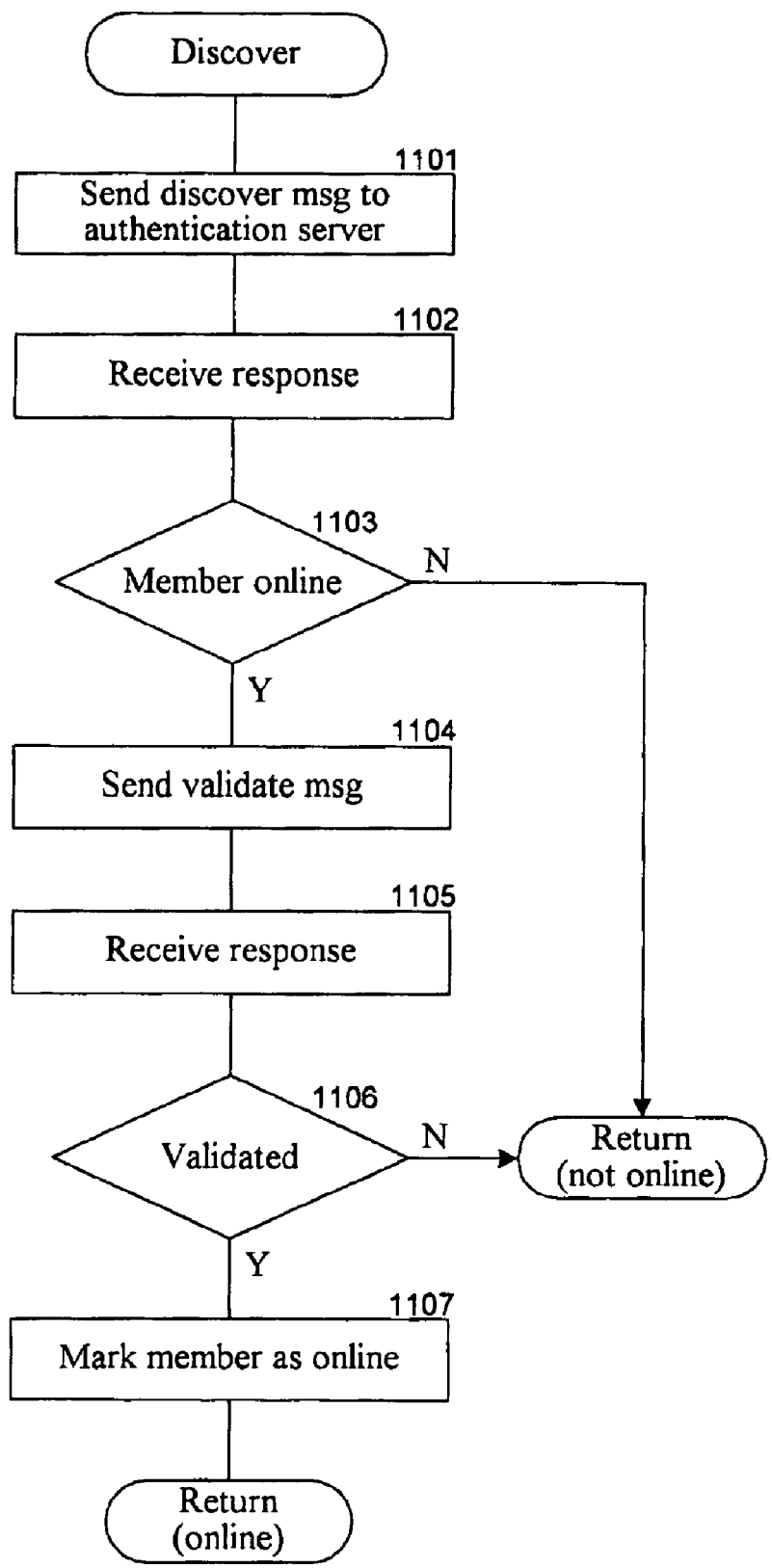
FIG. 11 is a flow diagram illustrating the processing of discovering a computer system.

FIG. 11 is a flow diagram illustrating the processing of discovering a computer system. This component is invoked when a computer system wants to send a message to another computer system. The component is passed the identification of the computer system to be discovered. The authentication server maps the identification of online computer systems to their corresponding addresses. In block 1101, the component sends a discover request message to the authentication server. In block 1102, the component receives a discover response message from the authentication server. In decision block

1103, if the computer system is online, then the component continues at block 1104, else the component returns an indication that the computer system is not online. In block 1104, the component sends a validate message to the computer system at the received address. In block 1105, the component receives a validate response message from the computer system or an error message. In decision block 1106, if the computer system has been validated, then the component returns an indication that the computer system is online, else the component returns an indication that computer system is not online.

From the foregoing it will be appreciated that although specific embodiments of the file sharing system have been described herein for purposes of illustration, various modifications may be made without deviating from the spirit and scope of the invention. Accordingly, the invention is not limited except by the appended claims.

We claim:

1. A method performed by a first computer system for sharing a file having content that is stored at a second computer system, the method comprising:

receiving at the first computer system a first metadata from the second computer system, wherein the metadata includes a file name, a create date of the file, a last modified date of the file, and a size of the file;

creating a virtual file using a file system of the first computer system, wherein the creating the virtual file is based on the received first metadata from the second computer system, wherein the virtual file does not include the content of the file, the virtual file having the first metadata represented as attributes of the virtual file;

storing the first metadata of the file in association with the virtual file, wherein the virtual file has a file type indicating the virtual file;

displaying the name of the file including a file name extension of an actual file together with an indicator indicating that the virtual file is a virtual file; and after the file is changed at the second computer system, receiving from the second computer system a second metadata for the file, the second metadata including an updated size of the file, and updating the first metadata stored in association with the virtual file based on the received second metadata, wherein the file is accessed by using the first metadata that identifies the file to retrieve the content of the file from the second computer system, wherein before the retrieving the file stored at the second computer system, logging on to a server, retrieving from the server an address and a public key for the second computer system, wherein the logging on includes providing the address and the public key to the server to validate authenticity of the second computer system, wherein the address is Internet Protocol (IP) address; and associating a virtual file program with the file type so that when the virtual file is accessed the virtual file program executes to coordinate an access, wherein the first computer system and the second computer system are members of a group of computer systems that share files, wherein one computer system of the group is designated as a group owner, the one computer system that stores a shared file is designated as a file owner, and changes to the second metadata of the shared file are sent from the file owner to the group owner for distribution to other members of the group.

2. The method of claim 1 wherein the virtual file is accessed, a virtual file component receives a notification from the file system, retrieves metadata associated with the virtual file, and controls the retrieving of the file stored at the second computer system.

3. The method of claim 1 including before retrieving the file stored at the other computer system, retrieving from a server an address for the second computer system.

4. The method of claim 1 wherein the public key is used to validate authenticity of the second computer system.

5. The method of claim 1 wherein the file is transferred on a peer-to-peer basis.

6. The method of claim 1 wherein metadata for the created virtual file is stored as attributes of the created virtual file.

7. The method of claim 1 wherein the created virtual file is stored in a file system folder associated with the second computer system.

8. The method of claim 1 wherein metadata includes an identifier of the second computer system.

9. The method of claim 1 including requesting the second computer system to provide current metadata for the virtual file.

10. The method of claim 9 wherein the requesting is performed when the computer logs onto the server.

11. The method of claim 1, wherein one computer system of the group is designated as a group owner, the computer system that stores the shared file is designated as the file owner, and the file owner transfers the shared file to the group owner to act as a proxy file owner.

12. A method performed by a first computer system for sharing a file stored at a second computer system, the method comprising:

receiving from the second computer system a notification that the file is to be shared with the first computer system;

receiving at the first computer system a first metadata from the second computer system, wherein the first metadata includes a file name, a create date of the file, a last modified date of the file, and a size of the file;

creating a virtual file using a file system of the first computer system, wherein the creating the virtual file is based on the received first metadata from the second computer system, wherein the virtual file does not include the content of the file, the virtual file having the first metadata represented as attributes of the virtual file;

storing the metadata of the file in association with the virtual file without storing at least some content included within the file on the second computer system;

displaying the name of the file including a file name extension of an actual file together with an indicator indicating that the virtual file is a virtual file; and after the file is changed at the second computer system, receiving from the second computer system a second metadata for the file, the second metadata including an updated size of the file, and updating the first metadata stored in association with the virtual file based on the received second metadata, wherein the file is accessed by using the first metadata that identifies the file to retrieve the content of the file from the second computer system, wherein before the retrieving the file stored at the second computer system, logging on to a server, retrieving from the server an address and a public key for the second computer system, wherein the logging on includes providing the address and the public key to the server to validate authenticity of the second computer system, wherein the address is Internet Protocol (IP) address; and associating a virtual file program with the file type so that when the virtual file is accessed the virtual file program executes to coordinate an access, wherein the first computer system and the second computer system are members of a group of computer systems that share files, wherein one computer system of the group is designated as a group owner, the computer system that stores a shared file is designated as a file owner, and changes to the second metadata of the shared file are sent from the file owner to the group owner for distribution to other members of the group.

13. A computer system for allowing multiple computers to share one or more files, the system including :
- a first computer system at which files including content are stored, wherein the first computer system stores an address list for identifying one or more additional computers that can share the files;
- memory that includes computer-executable instructions for performing:
- receiving at the first computer system a first metadata from a second computer system, wherein the first metadata includes a file name, a create date of the file, a last modified date of a file, and a size of the file;
- creating a virtual file using a file system of the first computer system, wherein the creating the virtual file is based on the received first metadata from the second computer system, wherein the virtual file does not include the content of the file, the virtual file having the first metadata represented as attributes of the virtual file;
- storing the first metadata of the file in association with the virtual file, wherein the virtual file has a file type indicating the virtual file;
- displaying the name of the file including a file name extension of an actual file together with an indicator indicating that the virtual file is a virtual file; and
- after the file is changed at the second computer system, receiving from the second computer system a second metadata for the file, the second metadata including an updated size of the file, and updating the first metadata stored in association with the virtual file based on the received second metadata, wherein the file is accessed by using the first metadata that identifies the file to retrieve the content of the file from the second computer system, wherein before the retrieving the file stored at the second computer system, logging on to a server, retrieving from the server an address and a public key for the second computer system, wherein the logging on includes providing the address and the public key to the server to validate authenticity of the second computer system, wherein the address is Internet Protocol (IP) address; and
- associating a virtual file program with the file type so that when the virtual file is accessed the virtual file program executes to coordinate an access, wherein the first computer system and the second computer system are members of a group of computer systems that share files, wherein one computer system of the group is designated as a group owner, the one computer system that stores a shared file is designated as a file owner, and changes to the second metadata of the shared file are sent from the file owner to the group owner for distribution to other members of the group.

14. The computer system of claim 13, wherein each of the one or more computers that share the files can change the content of a shared file by requesting a copy of the content of the shared file from the first computer system, changing the content of the file received from the first computer system and sending updated metadata describing the changes made to the content to the first computer system.

* * * * *